United States Patent
Box et al.

(10) Patent No.: US 8,615,759 B2
(45) Date of Patent: Dec. 24, 2013

(54) METHODS AND APPARATUS FOR DATA CENTER MANAGEMENT INDEPENDENT OF HYPERVISOR PLATFORM

(75) Inventors: Julian J. Box, Jersey Channel Islands (GB); Kevin D. Reid, Bethesda, MD (US); Mark A. Thomas, Bedford (GB)

(73) Assignee: Virtustream, Inc., Bethesda, MA (US)

( * ) Notice: Subject to any disclaimer, the term of this patent is extended or adjusted under 35 U.S.C. 154(b) by 91 days.

(21) Appl. No.: 13/031,847

(22) Filed: Feb. 22, 2011

(65) Prior Publication Data

US 2012/0047501 A1 Feb. 23, 2012

Related U.S. Application Data

(60) Provisional application No. 61/306,752, filed on Feb. 22, 2010.

(51) Int. Cl.
*G06F 9/46* (2006.01)

(52) U.S. Cl.
USPC ............................................................ 718/1

(58) Field of Classification Search
None
See application file for complete search history.

(56) References Cited

U.S. PATENT DOCUMENTS

| | | |
|---|---|---|
| 2007/0050764 A1 | 3/2007 | Traut |
| 2008/0201414 A1 | 8/2008 | Husain et al. |
| 2008/0256530 A1* | 10/2008 | Armstrong et al. ........... 717/174 |
| 2009/0049453 A1 | 2/2009 | Baran et al. |
| 2009/0089781 A1 | 4/2009 | Shingai et al. |
| 2009/0249366 A1 | 10/2009 | Sen et al. |

OTHER PUBLICATIONS

Virtustream, Inc. PCT/US11/25657. International Search Report-Written Opinion (Jun. 1, 2011).

* cited by examiner

*Primary Examiner* — Gregory A Kessler
(74) *Attorney, Agent, or Firm* — DLA Piper LLP (US)

(57) ABSTRACT

In some embodiments, an apparatus can include a memory configured to store a first hypervisor message and a second hypervisor message. The apparatus can further include a hypervisor interface module. The hypervisor interface module can retrieve, from the memory, the first hypervisor message and the second hypervisor message. The hypervisor interface module can define a first signal, the first signal being based at least in part on the first hypervisor message and having a first format associated with a first hypervisor platform. The hypervisor interface module can define a second signal, the second signal being based at least in part on the second hypervisor message and having a second format associated with a second hypervisor platform. The hypervisor interface module can send the first signal to a first virtual machine instantiated according to the first hypervisor platform. The hypervisor interface module can send the second signal to a second virtual machine instantiated according to the second hypervisor platform.

26 Claims, 3 Drawing Sheets

METHODS AND APPARATUS FOR DATA CENTER MANAGEMENT INDEPENDENT OF HYPERVISOR PLATFORM

CROSS-REFERENCE TO RELATED APPLICATION

This application claims priority to and the benefit of U.S. Provisional Patent Application Ser. No. 61/306,752, entitled "Methods and Apparatus for Data Center Management Independent of Hypervisor Platform," filed Feb. 22, 2010, the disclosure of which is hereby incorporated by reference in its entirety.

BACKGROUND

Embodiments described herein relate generally to virtual resources within a data center, and, in particular, to methods and apparatus for data center management independent of hypervisors that have different hypervisor platforms.

A hypervisor can be configured to manage hardware resources of, for example, a host device within a data center environment (e.g., a cloud computing data center environment) so that multiple virtual resources can operate concurrently at the host device. Within a relatively large-scale infrastructure of a data center environment, several incompatible hypervisors, such as a VMware hypervisor and a Xen hypervisor, may be operating within different host devices of the data center environment. Hypervisors can be incompatible because they have different hypervisor platforms. Accordingly, management modules configured to manage virtual resources via a hypervisor based on a first hypervisor platform using a particular signaling protocol may not be able to manage virtual resources via a hypervisor based on a second hypervisor platform. Management of host devices and virtual resources operating on these host devices can be relatively inefficient, complicated, and, in some cases, impossible, because of the incompatibility of the various hypervisors installed on these host devices. Methods and apparatus for managing a data center having various hypervisors with diverse functionality in a unified management system in a desirable fashion are not known.

Thus, a need exists for methods and apparatus for data center management independent of hypervisors that have different hypervisor platforms.

SUMMARY

In some embodiments, an apparatus can include a memory configured to store a first hypervisor message and a second hypervisor message. The apparatus can further include a hypervisor interface module. The hypervisor interface module can retrieve, from the memory, the first hypervisor message and the second hypervisor message. The hypervisor interface module can define a first signal, the first signal being based at least in part on the first hypervisor message and having a first format associated with a first hypervisor platform. The hypervisor interface module can define a second signal, the second signal being based at least in part on the second hypervisor message and having a second format associated with a second hypervisor platform. The hypervisor interface module can send the first signal to a first virtual machine instantiated according to the first hypervisor platform. The hypervisor interface module can send the second signal to a second virtual machine instantiated according to the second hypervisor platform.

DETAILED DESCRIPTION

Figure 1:
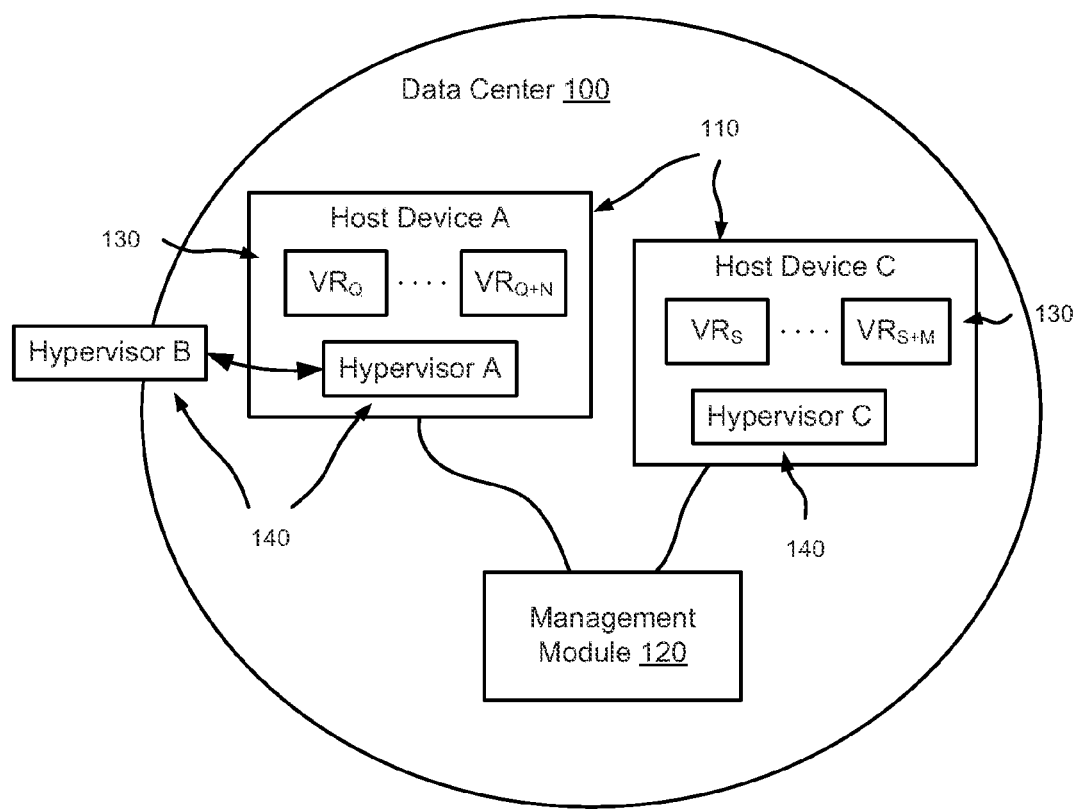
FIG. 1 is a schematic diagram that illustrates a management module configured to manage functions related to operation of a data center independent of hypervisor platform, according to an embodiment.

A management module can be configured to manage operations of a data center independent of hypervisor platform. For example, the management module can be configured to manage disaster recovery of the data center, virtual resource provisioning and/or reallocation, virtual resource operation, event reporting, data center security, and/or so forth (which can be collectively referred to as management functions) via interactions with various potentially incompatible hypervisors executing within a data center environment. Specifically, the management module can be configured to perform various management functions associated with the operation of virtual resources at host devices, which can each be operating hypervisors that have incompatible hypervisor platforms. A virtual resource when operating with a hypervisor that has a hypervisor platform can be referred to as operating within the hypervisor environment.

Because they have different hypervisor platforms (or because they operate based on different hypervisor platforms) hypervisors can be incompatible. For example, signals such as function calls and/or signaling protocols that can be used by a hypervisor based on a first hypervisor platform may not be compatibly used by another hypervisor based on a second hypervisor platform. Said differently, signals associated with a first hypervisor platform may have a first format associated with that hypervisor platform, and as such may be incompatible with signals associated with a second hypervisor platform having a second format. The management module is configured to, for example, handle signaling so that the management module can manage one or more virtual resources of a data center via a hypervisor independent of the platform of the hypervisor. The platform of a hypervisor can be defined, for example, by a particular runtime library, a functionality, an architecture, a communication protocol, an operating system, a programming language, a hypervisor version, and/or so forth. In some embodiments, the platform of a hypervisor can be, for example, based on a hosted software application architecture executing within an operating-system environment, or a native software application architecture that executes directly on the hardware of one or more host devices.

In some embodiments, the management module can be configured to detect the different hypervisors and can be configured to manage virtual resources operating with the different hypervisors via a hypervisor interface module. In some embodiments, the management module can be configured to manage (e.g., perform management functions related to) the virtual resources based on signals exchanged between the management module and the virtual resources and/or the hypervisor. In some embodiments, the management module can be configured to send and/or receive one or more signals configured to cause a specified command, function, method and/or operation to be executed by a managed hypervisor or a virtual resource included therein (e.g., a virtual machine). The hypervisor interface module can be configured to handle (e.g., translate) signaling related to hypervisors having different platforms so that the differences in hypervisor platforms are transparent (or substantially transparent) to the hypervisors and the management module.

FIG. 1 is a schematic diagram that illustrates a management module 120 configured to manage operation of a data center 100 independent of hypervisor platform, according to an embodiment. As shown in FIG. 1, virtual resources $VR_Q$ through $VR_{Q+N}$ are configured to operate at host device A, and virtual resources $VR_S$ through $VR_{S+M}$ are configured to operate at host device C. The host device A and the host device C can be collectively referred to host devices 110, and the virtual resources $VR_Q$ through $VR_{Q+N}$ and the virtual resources $VR_S$ through $VR_{S+M}$ can be collectively referred to as virtual resources 130.

As shown in FIG. 1, the operation of each of the virtual resources $VR_Q$ through $VR_{Q+N}$ at host device A is managed by hypervisor A, and the operation of each of the virtual resources $VR_S$ through $VR_{S+M}$ at host device C is managed by hypervisor C. Hypervisor A, hypervisor B, and hypervisor C represent hypervisors that are incompatible with one another because they have (or operate based on) different hypervisor platforms. For example, hypervisor A can be a VMware hypervisor, hypervisor B can be a Xen hypervisor, and hypervisor C can be a Hyper-V hypervisor. The hypervisors A through C can be collectively referred to as hypervisors 140.

The management module 120 shown in FIG. 1 is configured to perform various management functions related to, for example, the operation of the virtual resources 130 at the host devices 110 of the data center 100 even though hypervisor A, which is operating at host device A, is different than (e.g., incompatible with) hypervisor C, which is operating at host device C. Specifically, the management module 120 is configured to perform management functions related to the virtual resources 130 of the host devices 110, which may require exchange of signals (e.g., signals that include data, signals to call (or invoke) one or more functions) with the hypervisors 140 of the host devices 110, even though each of the host devices 110 shown in FIG. 1 is operating based on a hypervisor 140 that has a different hypervisor platform.

In some embodiments, each of the virtual resources 130 can be, for example, a resource configured to share underlying hardware resources and/or software resources of the data center 100 such as the hardware resources and/or software resources of the host devices A and C. In some embodiments, one or more of the virtual resources 130 can be a virtual machine, a software module, and/or so forth. In such embodiments, one or more of the virtual resources 130 can be a virtual machine executing a given operating system or platform, the operating system including or executing one or more instances of one or more processes or applications, each including one or more associated functions, modules and/or the like. In some embodiments, one or more of the virtual resources 130 can be configured to emulate the functionality of, for example, a physical device such as a server.

The management module 120 is configured perform various management functions related to the operation of the virtual resources $VR_Q$ through $VR_{Q+N}$ at host device A even when hypervisor A is replaced with hypervisor B as shown in FIG. 1. In some embodiments, hypervisor A can be uninstalled from the host device A and hypervisor B can be subsequently installed at host device A. In some embodiments, hypervisor A can be replaced in a hot-swap transition (e.g., in a real-time transition, in a dynamic transition) by hypervisor B. In some embodiments, the virtual resources $VR_Q$ through $VR_{Q+N}$ can be translated (e.g., reformatted, changed from one protocol to another protocol) using a translation module (not shown) so that the virtual resources $VR_Q$ through $VR_{Q+N}$ can operate with hypervisor B after hypervisor A is replaced with hypervisor B. In such embodiments, the above-described hot-swap and/or virtual resource translation can be performed by the management module 120 and/or the above-described translation module. Although not shown, in some embodiments, the management module 120 can be configured to perform management functions related to the operation of virtual resources at a host device that is partitioned so that incompatible hypervisors concurrently operate within the different partitions of the host device.

In some embodiments, one or more of the hypervisors 140 shown in FIG. 1 can be a different version of another hypervisor. For example, hypervisor A can be an earlier version of hypervisor B. Accordingly, the management module 120 can be configured to, for example, send signals to and/or receive signals from both the hypervisor version A and the hypervisor version B.

Although not shown, in some embodiments, the hardware resources and/or software resources of the data center 100 can include one or more levels of infrastructure. For example, in some embodiments, the hardware resources of the data center 100 can include storage devices, host devices, access switches, aggregation devices, routers, interface components, cables, and/or so forth. Although the specifics are not shown in FIG. 1, the host devices 110 can be included in and/or integrally connected to the infrastructure of the data center 100. For example, the data center 100 can be configured so that the host devices 110 can be in communication with (e.g., coupled to) a layer of access switches that are in communication with (e.g., coupled to) a layer of aggregation devices. The aggregation devices can function as gateway devices into a set of routers/switches that function as core switching elements of the data center 100. The host devices 110 can be configured to communicate with one another via at least a portion of the infrastructure of the data center 100.

In some embodiments, the data center 100 can also include software resources, for example, management modules (such as management module 120), operating systems, hypervisors (such as hypervisors A, B, and C), and/or so forth. The software resources can be configured to enable use of the hardware resources of the data center 100 in a particular fashion. For example, the hypervisors can be configured to facilitate (or enable) virtualization of hardware resources of a host device(s). The operating systems can be installed at hardware resources such as routers, aggregation devices, routers, core switching elements, and/or forth so that other software can function at these hardware resources in a desirable fashion.

In some embodiments, the data center 100 can be a cloud computing environment where the hardware resources and/or software resources are shared by multiple virtual resources associated with one or more users (e.g., clients, customers). In other words, the hardware resources (e.g., host devices, access switches, aggregation devices, core switching elements) and/or software resources (e.g., operating systems, hypervisors) can collectively define a virtualized environment within which the virtual resources (such as virtual resources 130) can operate. In some embodiments, the virtualized environment defined by the data center 100 can be referred to as a data center virtualized environment. More details related to a virtualized environment are described in co-pending patent application having attorney docket no. VITU-001/00US 311331-2001, filed on same date, entitled, "Methods and Apparatus for Movement of Virtual Resources within a Data Center Environment," and co-pending patent application having attorney docket no. VITU-003/00US 311331-2003, filed on same date, entitled, "Methods and Apparatus Related to Unit-Based Virtual Resources within a Data Center Environment," both of which are incorporated herein by reference in their entireties.

Figure 2:
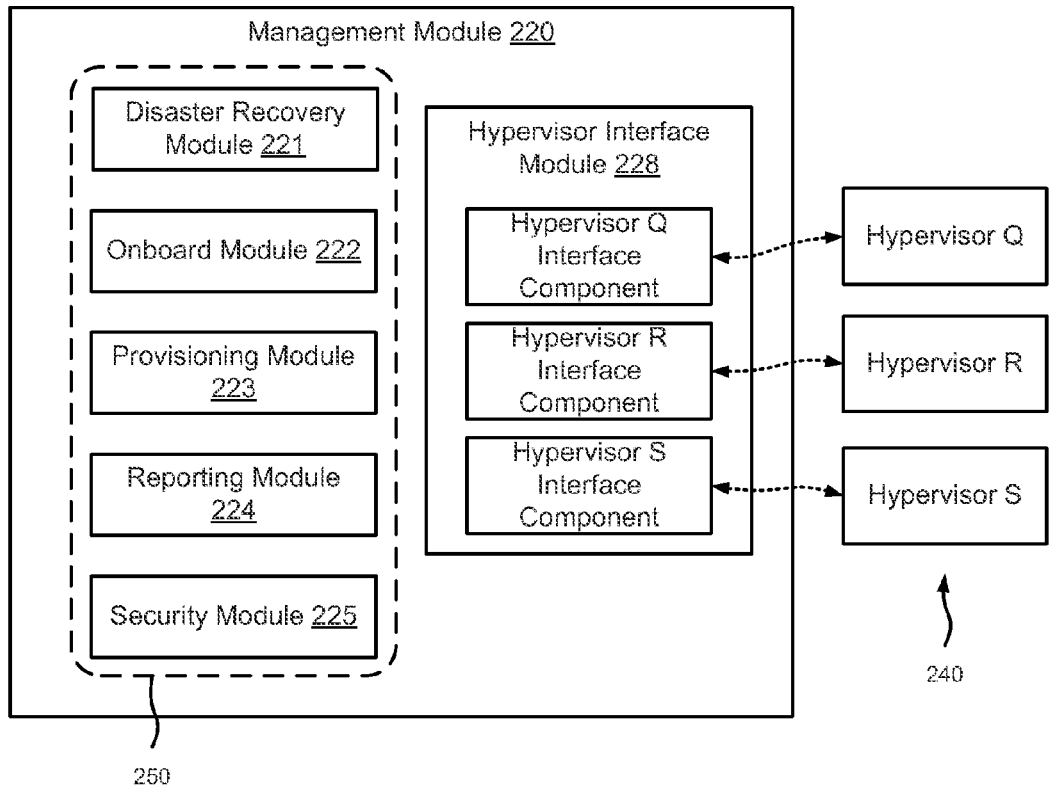
FIG. 2 is a schematic diagram that illustrates a management module that has management components configured to perform data center management functions via a hypervisor interface module, according to an embodiment.

FIG. 2 is a schematic diagram that illustrates a management module 220 that has management components 250 configured to perform data center management functions via a hypervisor interface module 228, according to an embodiment. As shown in FIG. 2, the hypervisor interface module 228 includes hypervisor interface components—hypervisor Q interface component, hypervisor R interface component, and hypervisor S interface component. Each of the individual hypervisor interface components can be configured to, for example, facilitate signaling (e.g., signaling related to management of virtual resources, data exchange, calling functions) between the management module 220 and one of the respective different incompatible hypervisors—hypervisor Q, hypervisor R, or hypervisor S. Specifically, hypervisor Q interface component, hypervisor R interface component, and hypervisor S interface component are configured to facilitate signaling between the management components 250 of the management module 220 and hypervisor Q, hypervisor R, and hypervisor S, respectively. Although not shown, the hypervisors Q, R, and S can each be associated with one or more virtual resources and can each be operating within a portion (e.g., a host device) of a data center. The hypervisors Q, R, and S can be collectively referred to as hypervisors 240. In some embodiments, the hypervisor interface components can function as a library of hypervisor interface components, or as a set of hypervisor interface components.

For example, hypervisor Q interface component can be configured to translate (e.g., reformat, recast) one or more signals produced by hypervisor Q so that the signal can be processed (e.g., processed in a compatible fashion) at one or more of the management components 250. Similarly, the hypervisor Q interface component can be configured to translate one or more signals produced by one or more of the management components 250 into a signal that can be processed be processed (e.g., processed in a compatible fashion) at hypervisor Q. In some embodiments, the hypervisor Q interface component can be configured to translate a signal from a first protocol compatible with the hypervisor Q to a signal compatible with one or more of the management components 250, and vice versa. In sum, the hypervisor interface module 228 can be configured to handle (e.g., translate) signaling between the hypervisors 140 and the management components 250 so that the differences in hypervisor platforms are transparent (or substantially transparent) to the hypervisors 140 and the management components 250.

In some embodiments, the hypervisor interface module 228 (e.g., a hypervisor interface component from the hypervisor interface module 228) can be configured to facilitate communication based on one or more application programming interfaces (APIs). For example, the hypervisor interface module 228 can be configured to handle signaling between the management components 250 and the hypervisors 240 based on an API associated with one or more of the management components 250 and an API associated with one or more of the hypervisors 240. Specifically, the hypervisor interface module 228 can be configured to translate a signal based on an API associated with the management components 250 into a signal based on an API associated with the hypervisors 240.

In some embodiments, one or more of the functions of the hypervisor interface module 228 can be implemented as a plug-in module to the hypervisors 240. For example, the translation functionality of the hypervisor R interface component can be an individually compiled (or interpretable) module that can be plugged into the hypervisor R. In other words, the one or more portions of the hypervisor R interface component can be complied before being associated with hypervisor R. The pluggable functionality of the hypervisor R interface component can be implemented using, for example, a run-time environment and/or an application framework such as a Microsoft .NET framework and/or an object oriented programming language such as C++ or an interpreted programming language such as Java. In some embodiments, the plug-in module can be an uncompiled module. In some embodiments, the functionality of the hypervisor interface module 228 can be configured to execute in a device separate from the management module 220 and host devices where the hypervisors 140 can be installed. In some embodiments, the hypervisor interface modules 228 can be configured to operate in one or more stand-alone devices.

In some embodiments, the hypervisor interface module 228 can be updated when, for example, a new hypervisor is introduced into a data center. For example, the hypervisor interface module 228 can be updated to include a new hypervisor interface component (or new version of a hypervisor interface component) associated with a hypervisor not previously associated with (e.g., installed within) a data center. Because the hypervisor interface module 228 can be updated, the management functions 250 can continue operation (e.g., continue operation in an uninterrupted fashion) without being modified (or substantially without being modified). In other words, the operation of the management functions 250 related to virtual resources associated with other hypervisor platforms can seamlessly continue even with the introduction of the new hypervisor platform. When the new hypervisor platform is activated, the management module 220 can be configured to being management functions related to virtual resources associated with the new hypervisor platform. In some embodiments, the hypervisor interface module 228 can be configured so that such updates can be made during run-time of the management module 220 (without terminating or pausing the operation of the management module 220). Similarly, hypervisor interface components that are obsolete can be removed from the hypervisor interface module 228.

In some embodiments, the hypervisor interface module 228 can be configured to detect (using a detection module (not shown)) that a signal is produced by a particular hypervisor (from the hypervisors 140) and can be configured to trigger (e.g., invoke) the appropriate hypervisor interface component of the hypervisor interface module 228 to handle the signal. For example, the hypervisor interface module 228 can be configured to receive a signal from hypervisor R and can be configured to detect that the signal is from hypervisor R based on, for example, a protocol and/or format of the signal based at least in part on a hypervisor platform of the hypervisor R. Accordingly, the hypervisor interface module 228 can be configured to send (or direct) the signal to the hypervisor R interface component so that the hypervisor R interface component can process the signal for use by, for example, one or more of the management components 250.

In some embodiments, the hypervisor interface module 228 can be configured to invoke (or trigger) one or more of the hypervisor interface components to handle one or more signals produced at one or more of the management components 250. For example, the hypervisor interface module 228 can be configured to receive a signal from provisioning module 223. The hypervisor interface module 228 can be configured to determine, for example, based on the contents of the signal and/or another indicator accompanying the signal, that the signal is directed to a virtual resource (not shown) associated with hypervisor S. Accordingly, the hypervisor interface module 228 can be configured to send (or direct) the signal to the hypervisor S interface component so that the hypervisor S interface component can process the signal so that it can be used by, for example, hypervisor S.

As shown in FIG. 2, the management components 250 include a disaster recovery module 221, an onboard module 222, a provisioning module 223, a reporting module 224, and a security module 225. The management components 250 shown in FIG. 2 are presented by way of example. Accordingly, the management components 250 can include different management components 250 than those shown in FIG. 2. For example, the management components 250 of the management module 220 can exclude some of the management components 250 shown in FIG. 2 and/or can include additional management components (not shown). For example, the management components 250 can include a cost module (not shown) configured to handle cost calculations related to a data center.

The disaster recovery module 221 can be configured to handle recovery of a virtual resource of a data center in response to a failure of a hardware resource (e.g., a host device) operating the virtual resource. For example, the disaster recovery module 221 can be configured to manage a failover process (e.g., a storage failover process) and a failback process (e.g., a storage failback process). In some embodiments, the disaster recovery module 221 can be configured to implement an orderly shutdown of a device during failover, register virtual resources after failover, and/or manage a workflow related to disaster recovery. The hypervisor interface module 228 can be configured to, for example, translate signaling between the disaster recovery module 221 and the hypervisors 140 so that disaster recovery related to virtual resources of the hypervisors 140 can be performed.

More specifically, the disaster recovery module 221 can be configured to determine that a hardware resource (e.g., server device) at which the virtual resource is hosted is experiencing a partial or complete failure. For example, the disaster recovery module 221 can receive a first signal from a hardware resource at which the hypervisor Q is hosted, indicating an imminent failure thereof. This first signal can optionally be received in response to one or more user input signals, indicating the failure of the hardware resource and/or a reallocation of virtual and/or hardware resources per user input and/or instruction.

In some embodiments, the first signal can be formatted in accordance with a first hypervisor platform of the hypervisor Q. In some embodiments, the disaster recovery module 221 can receive the first signal via the hypervisor Q interface component of the hypervisor interface module 228 of the management module 220. In such embodiments, the hypervisor Q interface component can be configured to translate the received first signal from the format of the hypervisor Q into a format that can be discerned and/or processed by the disaster recovery module 221.

In response to the received signal, the disaster recovery module 221 can define and send a second signal to a second hardware resource (e.g., server device), such as a hardware resource hosting the hypervisor R. By sending the second signal via the hypervisor R interface component, the disaster recovery module 221 can ensure compatibility of the second signal with the hypervisor R. In some embodiments, the second signal can include one or more instructions configured to cause the hypervisor R to define a new virtual resource, such as a copy of the virtual resource configured to be compatible with the format and/or hypervisor platform of the hypervisor R. In this manner, the disaster recovery module 221 can replace a first (e.g., imminently failing) virtual resource operating at a first hypervisor according to a first hypervisor platform by defining a functional copy of the virtual resource operating at a second hypervisor according to a second hypervisor platform.

In some embodiments, the disaster recovery module 221 can be further configured to send one or more additional signals to the copy of the hypervisor operating at the hypervisor R (via the hypervisor R interface component). The one or more signals can optionally include, for example, one or more instructions configured to trigger and/or invoke one or more functions, subroutines, methods, and/or other modules to perform a specified function or functions. In some embodiments, the copy of the virtual resource can be a copy of a virtual machine, and the one or more signals can include setting, state and/or environment information sufficient to cause an application executing within the copy of the virtual machine to have a desired state. The desired state can be, for example, a same state as that of an initial version of that application formerly executing at an initial copy of the virtual machine at the first hardware resource prior to the above-described translation/transplant process.

The one or more signals can alternatively include one or more management instructions for the virtual resource, such as a "play" (i.e., execute), pause, unpause, or other command configured to cause the virtual machine to execute, pause, and/or recommence execution. As described above, each of the one or more signals can be formatted according to a second format of the second hypervisor platform, such that the second virtual resource (e.g., copy of a virtual machine) can interpret and/or process the one or more signals. The onboard module 222 can be configured to facilitate migration of one or more portions of a source (e.g., a legacy physical device, a legacy application) to a data center (e.g., a cloud computing data center environment). Migration can include the process of converting one or more functions of the source into a virtual resource (e.g., a virtual machine) that can emulate (or replicate) the source and that can be executed within the data center. The onboard module 222 engine can be configured to facilitate (e.g., implement) various portions of the migration process, which can include, for example, an assessment phase, a conversion phase, a quarantine phase, a management phase, and/or so forth. In some embodiments, the onboard module 222 can be referred to as an onboard engine. The hypervisor interface module 228 can be configured to facilitate signaling related to, for example, conversion of a source into virtual resources and/or quarantine of the virtual resources at host devices where the hypervisors 140 are executing. More details related to an onboard module are described in co-pending patent application having attorney docket no. VITU-002/00US 311331-2002, filed on same date, entitled, "Methods and Apparatus Related to Migration of Customer Resources to Virtual Resources within a Data Center Environment," which is incorporated herein by reference in its entirety.

The provisioning module 223 can be configured to provision the virtual resources at host devices where the hypervisors Q, R, and/or S may be executing. The hypervisor interface module 228 can be configured to facilitate signaling (e.g., exchange of configuration profiles) between the provisioning module 222 and the hypervisors 140, for example, as related to provisioning of virtual resources associated with each of the hypervisors 140. More specifically, the provisioning module 223 can send one or more signals to any virtual resource executing at any of the host devices where the hypervisors Q, R, and/or S may be executing. The one or more signals can be sent such that the recipient hypervisor causes one or more new virtual resources to be defined and/or provisioned at that host device. In some embodiments, such a signal can be sent in response to a user command, input or directive and/or in response to one or more resource constraints or optimization algorithms associated with the management module 220 and/or the host devices. In some embodiments, such a signal can be sent in response to a failure of a host device and/or virtual resource, so as to preserve a functioning copy of that virtual resource (as described above).

The reporting module 224 can be configured to define one or more alerts (e.g., error alerts) that can be sent to a user (e.g., a customer, a network administrator) (not shown) via a user interface (not shown). For example, the reporting module 224 can be configured to send a message related to a status of a disaster recovery process and/or a message related to a failure of a virtual resource. Status messages from virtual resources that are transmitted via the hypervisors 140 can be translated by the hypervisor interface module 228 so that they can be processed by the reporting module 224.

The security module 225 can be configured to handle security functions related to the data center such as authentication of new virtual resources, security protocols, firewalls, and/or so forth. The hypervisor interface module 228 can be configured to translate signals exchanged between the security module 225 and the hypervisors 140 so that, for example, authentication of new virtual resources associated with the hypervisors 140 can be performed.

In some embodiments, one or more portions of the management module 220 (e.g., the hypervisor interface module 228 of the management module 220) can be (or can include) a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor). Although not shown, in some embodiments, the management module 220 can include one or more memory portions (e.g., a random access memory (RAM) portion, a shift register, a cache) that can be used during operation of one or more functions of the management module 220. In some embodiments, one or more of the functions associated with the management module 220 can be included in different modules and/or combined into one or more modules.

Figure 3:
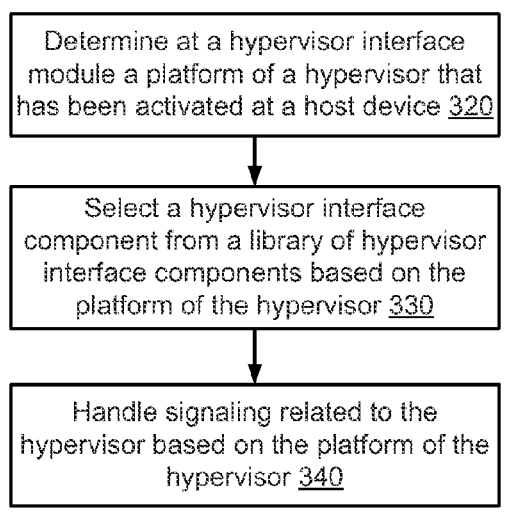
FIG. 3 is a flowchart that illustrates a method for communicating with a hypervisor having a specified platform, according to an embodiment.

FIG. 3 is a flowchart that illustrates a method for communicating with a hypervisor having a specified platform, according to an embodiment. In some embodiments, the method shown in FIG. 3 can be executed at a management module such as management module 120 shown in FIG. 1.

As shown in FIG. 3, a platform of a hypervisor that has been activated at a host device is determined at a hypervisor interface module, at 320. In some embodiments, the hypervisor can be activated (e.g., installed) at the host device in place of another hypervisor that has been deactivated (e.g., uninstalled). In some embodiments, the hypervisor can be a more recent version of the same hypervisor.

In some embodiments, the platform of the hypervisor can be determined based on analysis of a signal produced by the hypervisor. In some embodiments, the hypervisor can be configured to announce its activation to, for example, a management module (e.g., the hypervisor interface module of the management module). In some embodiments, a hypervisor interface module can be configured to query the hypervisor about the platform of the hypervisor. The hypervisor can be configured to respond to the query with details (e.g., APIs) about the hypervisor platform.

A hypervisor interface component can be selected from a library of hypervisor interface components based on the platform of the hypervisor, at 330. In some embodiments, a hypervisor interface component configured to handle signaling related to the platform of the hypervisor in a desirable fashion (according to a set of criteria) can be selected. Specifically, the hypervisor interface module can be configured to select a hypervisor interface component from the library of hypervisor interface components that is capable of handling signaling related to the platform of the hypervisor according to a criteria (or set of criteria). In some embodiments, the hypervisor interface module can be configured to store in a memory information (e.g., a database of information) related to the capabilities (e.g., translation capabilities, processing capabilities, processing speed, efficiency) of each of the hypervisor interface components. Based on this information the hypervisor interface module can be configured to select one or more of the hypervisor interface components to handle signaling related to the platform of the hypervisor.

In some embodiments, the hypervisor interface module can be configured to select a hypervisor interface component from a library of hypervisor interface components based the type of signaling from the hypervisor. For example, a particular hypervisor interface component can be selected from a set of hypervisor interface components capable of processing a signal because the particular hypervisor interface component can process the signal in a particular fashion (e.g., at a particular time, according to a user preference).

In some embodiments, the hypervisor interface component can be selected based on a user preference. For example, the hypervisor interface module can be configured to select a hypervisor interface component from a library of hypervisor interface components based on a user preference that a particular type of hypervisor interface component be used to handle signaling associated with the hypervisor platform. In some embodiments, one or more of the hypervisor interface components can be selected based on a default preference or default selection criteria.

In some embodiments, a hypervisor interface component can be configured to handle signaling related to multiple hypervisor platforms that may be incompatible with one another. In some embodiments, multiple hypervisor interface components can be selected and used to handle signaling from a single hypervisor platform. For example, in some embodiments, a first hypervisor interface component can be selected and used to handle a first signal (or portion thereof) from a hypervisor based on a platform. A second hypervisor interface component can be selected and used to handle another portion of the first signal and/or a second signal (or a portion thereof) from the hypervisor (or another hypervisor) based on the platform.

Signaling related to the hypervisor is handled based on the platform of the hypervisor, at 340. In some embodiments, the signaling, which can include data, function calls, and/or so forth, can be translated by the hypervisor interface module. In some embodiments, a signal produced by a management module (e.g., a management component of the management module) can be sent to the hypervisor after being translated by the hypervisor interface module into a signal based on the platform of the hypervisor. In some embodiments, a signal produced by a hypervisor, and based on the platform of the hypervisor, can be sent to a management module (e.g., a management component of the management module) after being translated by the hypervisor interface module into a signal that can be processed by the management module.

Figure 4:
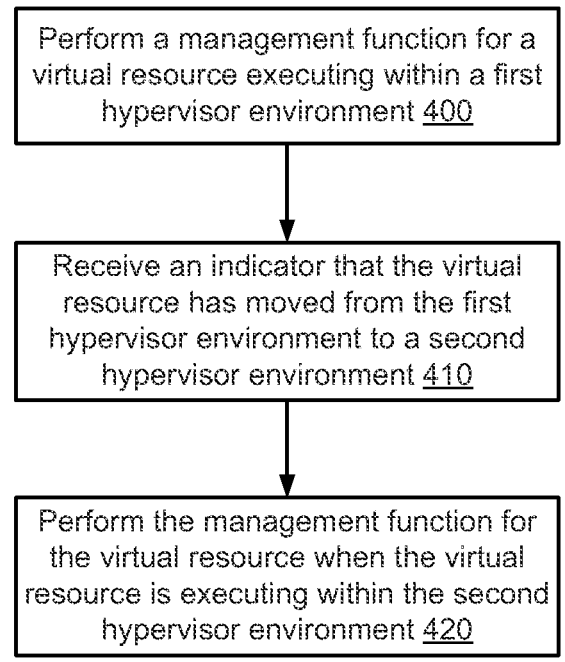
FIG. 4 is a flowchart that illustrates a method for performing a management function for a virtual resource moved from one hypervisor environment to another hypervisor environment, according to an embodiment.

FIG. 4 is a flowchart that illustrates a method for performing a management function for a virtual resource moved from one hypervisor environment to another hypervisor environment, according to an embodiment. As shown in FIG. 4, a management function is performed for a virtual resource executing within a first hypervisor environment, at 400. In some embodiments, signaling related to the management function can be translated by a hypervisor interface component associated with the first hypervisor environment.

An indicator that the virtual resource has moved from the first hypervisor environment to a second hypervisor environment is received, at 410. In some embodiments, the indicator can be received in response to a query to, for example, the virtual resource, the first hypervisor of the first hypervisor environment, and/or first hypervisor of the second hypervisor environment. The query can be defined by and can be sent from the hypervisor interface module. In some embodiments, the indicator can be sent (to a hypervisor interface module) from, for example, the virtual resource, the first hypervisor of the first hypervisor environment, and/or the second hypervisor of the second hypervisor environment.

The management function can be performed for the virtual resource when the virtual resource is executing within the second hypervisor environment, at 420. In some embodiments, signaling related to the management function can be translated by a hypervisor interface component associated with the second hypervisor environment.

Figure 5:
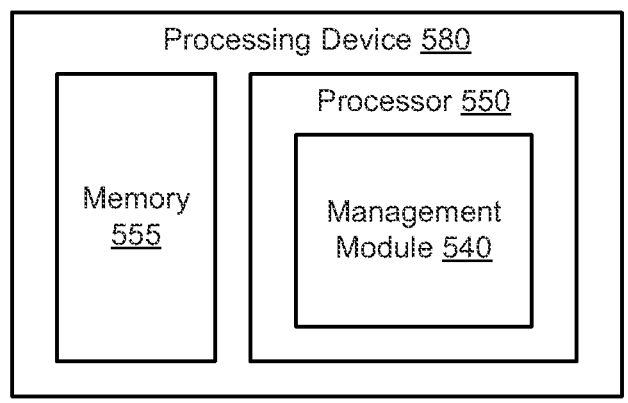
FIG. 5 is a schematic diagram that illustrates a management module configured to execute within a processor of a processing device, according to an embodiment.

FIG. 5 is a schematic diagram that illustrates a management module 540 configured to execute within a processor 550 of a processing device 580, according to an embodiment. The management module 540 can be configured to access (e.g., use) a memory 555 so that the management module 540 can perform functions related to management of a data center (not shown). In some embodiments, the processing device 580 can be, for example, a computer system, a server, a host device, a router, a switch device, and/or so forth included in (or associated with) a data center (such as data center 100 shown in FIG. 1).

Although not shown, in some embodiments, the management module 540 can be configured to execute on multiple processors and/or use multiple memory components. In some embodiments, the processor 550 can include a memory (e.g., a level-1 (L1) cache) (not shown). In such instances, the memory 555 (also can be referred to as a memory component) can be optionally included in the processing device 580.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using, for example, a run-time environment and/or an application framework such as a Microsoft .NET framework and/or Java, C++, or other programming languages (e.g., object-oriented programming languages) and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a memory configured to store a first hypervisor message and a second hypervisor message; and
a hypervisor interface module configured to:
retrieve, from the memory, the first hypervisor message and the second hypervisor message;
define a first signal, the first signal being based at least in part on the first hypervisor message and having a first format associated with a first hypervisor platform;
define a second signal, the second signal being based at least in part on the second hypervisor message and having a second format associated with a second hypervisor platform;
send the first signal to a first virtual machine instantiated according to the first hypervisor platform; and
send the second signal to a second virtual machine instantiated according to the second hypervisor platform;
determine, at the hypervisor interface module, a platform of a hypervisor that has been activated at a host device;
select, as a function of the platform of the hypervisor, a hypervisor interface component from a library of hypervisor interface components, wherein the selecting is performed via the hypervisor interface module configured to:
select the hypervisor interface component from the library of hypervisor interface components that is capable of handling signaling related to the platform of the hypervisor according to a criteria;
process first information for storage in a memory, the first information including two or more capabilities selected from a group composed of translation capabilities, processing capabilities, processing speed, and/or efficiency, of each of the hypervisor interface components; and
select, based on the first information, one or more of the hypervisor interface components to handle signaling related to the platform of the hypervisor; and
process signaling related to the hypervisor as a function of the platform of the hypervisor;

wherein the hypervisor interface module is configured to handle signaling related to hypervisors having different platforms such that differences in the hypervisor platforms are transparent to, or able to be rectified without user action in/while being translated between, the hypervisors.

2. The apparatus of claim 1, wherein the first signal is sent such that the first virtual machine invokes a specified function associated with a running process of the first virtual machine.

3. The apparatus of claim 1, wherein the first signal is associated with at least one of:
a disaster recovery function associated with the first virtual machine;
a virtual machine translation function associated with the first virtual machine and the second virtual machine;
a virtual resource provisioning function;
an event reporting function associated with the first virtual machine; or
a data center security function.

4. The apparatus of claim 1, wherein
the first virtual machine is instantiated at a first partition of the device,
the second virtual machine is instantiated at a second partition of the device,
the first signal is sent such that the first virtual machine is replaced, at the device, by the second virtual machine, and
the second signal is sent such that the second virtual machine performs a specified function associated with the first virtual machine.

5. The apparatus of claim 1, wherein
the first virtual machine is instantiated at a first device,
the second virtual machine is instantiated at a second device,
the first signal is sent such that the first virtual machine is deactivated,
the second hypervisor message is associated with a function of the first virtual machine, and
the second signal is sent such that the second virtual machine executes at least the function associated with the first virtual machine.

6. The apparatus of claim 1, wherein
the hypervisor interface module is further configured to receive a third signal including an instruction to instantiate the first virtual machine and the second virtual machine,
the first signal is sent such that the first virtual machine is instantiated at a first device according to the first hypervisor platform, and
the second signal is sent such that the second virtual machine is instantiated at the second device according to the second hypervisor platform.

7. The apparatus of claim 1, wherein
the hypervisor interface module is further configured to receive, from the first virtual machine, a third signal having the first format, and
send, to an output device, an alert message based at least in part on the third signal.

8. A non-transitory processor-readable medium storing code representing instructions configured to cause one or more processors operating in connection with a hypervisor interface module associated with a management module to:
receive, from a first device, a first signal having a first format associated with a first hypervisor platform and including information associated with a first virtual machine instantiated at the first device according to the first hypervisor platform;
send, to a second device, a second signal based at least in part on the first signal such that the second device defines a second virtual machine based on the first virtual machine, the second virtual machine being instantiated according to a second hypervisor platform, the second signal having a second format associated with the second hypervisor platform.

wherein the hypervisor interface module is configured for:
determining, at the hypervisor interface module, a platform of a hypervisor that has been activated at a host device;
selecting, as a function of the platform of the hypervisor, a hypervisor interface component from a library of hypervisor interface components, wherein the selecting is performed via the hypervisor interface module configured to:
select the hypervisor interface component from the library of hypervisor interface components that is capable of handling signaling related to the platform of the hypervisor according to a criteria;
process first information for storage in a memory, the first information including two or more capabilities selected from a group composed of translation capabilities, processing capabilities, processing speed, and/or efficiency, of each of the hypervisor interface components; and
select, based on the first information, one or more of the hypervisor interface components to handle signaling related to the platform of the hypervisor; and
processing signaling related to the hypervisor as a function of the platform of the hypervisor;
wherein the hypervisor interface module is configured to handle signaling related to hypervisors having different platforms such that differences in the hypervisor platforms are transparent to, or able to be rectified without user action in/while being translated between, the hypervisors;
wherein, as a function of the hypervisor interface module being configured to handle signaling related to hypervisors having different platforms, the management module is configured to send and/or receive one or more signals configured to cause a specified command, function, method and/or operation to be executed by a managed hypervisor or a virtual resource included in the managed hypervisor.

9. The non-transitory processor-readable medium of claim 8, wherein the first signal is received in response to a failure of the first device.

10. The non-transitory processor-readable medium of claim 8, wherein
the first virtual machine includes a first instance of an application, and
the second signal is sent such that the second device defines a second instance of the application for execution within the second virtual machine, the second instance of the application having a same application state as the first instance of the application.

11. The non-transitory processor-readable medium of claim 8, wherein the code further represents instructions configured to cause the processor to:
send, to the second device, a third signal configured to cause the second device to pause the second virtual machine, the third signal having the second format; and
send, in response to a fourth signal received from the first device, a fourth signal configured to cause the second device to unpause the second virtual machine, the fourth signal having the second format.

12. The non-transitory processor-readable medium of claim 8, wherein the first signal is received in response to a virtual machine reallocation instruction associated with the first device.

13. The non-transitory processor-readable medium of claim 8, wherein
the first signal is based at least in part on a first application programming interface (API) associated with the first hypervisor platform, and
the second signal is sent based at least in part on a second API associated with the second hypervisor platform.

14. The non-transitory processor-readable medium of claim 8, wherein
the first signal is received by a disaster recovery module, and
the second signal is sent by a provisioning module.

15. An apparatus, comprising:
a hypervisor interface module including:
    a first hypervisor interface component configured to exchange signals with a first hypervisor according to a first format associated with a first hypervisor platform, and
    a second hypervisor interface component configured to exchange signals with a second hypervisor according to a second format associated with a second hypervisor platform; and
a provisioning module configured to:
    send, to the first hypervisor interface component, a first signal configured to cause the first hypervisor interface component to send a second signal to the first hypervisor such that the second hypervisor defines a first virtual resource according to the first hypervisor platform, the second signal having the first format, and
    send, to the second hypervisor interface component, a third signal configured to cause the second hypervisor interface component to send a fourth signal to the second hypervisor such that the second hypervisor defines a second virtual resource according to the second hypervisor platform, the fourth signal having the second format; and
at least one processor and/or memory device configured to process one or more operations of the hypervisor interface module and/or the provisioning module;
wherein the hypervisor interface module is configured for:
determining, at the hypervisor interface module, a platform of a hypervisor that has been activated at a host device;
selecting, as a function of the platform of the hypervisor, a hypervisor interface component from a library of hypervisor interface components, wherein the selecting is performed via the hypervisor interface module configured to:
    select the hypervisor interface component from the library of hypervisor interface components that is capable of handling signaling related to the platform of the hypervisor according to a criteria;
    process first information for storage in a memory, the first information including two or more capabilities selected from a group composed of translation capabilities, processing capabilities, processing speed, and/or efficiency, of each of the hypervisor interface components; and
    select, based on the first information, one or more of the hypervisor interface components to handle signaling related to the platform of the hypervisor; and
processing signaling related to the hypervisor as a function of the platform of the hypervisor;

wherein the hypervisor interface module is configured to handle signaling related to hypervisors having different platforms such that differences in the hypervisor platforms are transparent to, or able to be rectified without user action in/while being translated between, the hypervisors.

16. The apparatus of claim 15, wherein the first signal is sent in response to a fifth signal received via user input, the fifth signal including an instruction to instantiate the first virtual resource according to the first hypervisor platform.

17. The apparatus of claim 15, wherein at least one of the first virtual resource and the second virtual resource is a virtual machine.

18. The apparatus of claim 15, wherein the first hypervisor platform is defined based at least in part on at least one of:
    a runtime library;
    a programming language; or
    a hypervisor version.

19. The apparatus of claim 15, wherein the first hypervisor interface module is defined in response to a fifth signal indicating a presence of the first hypervisor instantiated at a first device.

20. The apparatus of claim 15, wherein the second hypervisor interface module is selected from a library of hypervisor interface components based at least in part on a user preference.

21. A method for managing a data center, the method comprising:
exchanging signals, via a first hypervisor interface component of a hypervisor interface module, with a first hypervisor according to a first format associated with a first hypervisor platform, and
exchanging signals, via a second hypervisor interface component of the hypervisor interface module, with a second hypervisor according to a second format associated with a second hypervisor platform; and
via a provisioning module:
    sending, to the first hypervisor interface component, a first signal configured to cause the first hypervisor interface component to send a second signal to the first hypervisor such that the first hypervisor defines a first virtual resource according to the first hypervisor platform, the second signal having the first format, and
    sending, to the second hypervisor interface component, a third signal configured to cause the second hypervisor interface component to send a fourth signal to the second hypervisor such that the second hypervisor defines a second virtual resource according to the second hypervisor platform, the fourth signal having the second format;
determining, at the hypervisor interface module, a platform of a hypervisor that has been activated at a host device;
selecting, as a function of the platform of the hypervisor, a hypervisor interface component from a library of hypervisor interface components, wherein the selecting is performed via the hypervisor interface module configured to:
    select the hypervisor interface component from the library of hypervisor interface components that is capable of handling signaling related to the platform of the hypervisor according to a criteria;
    process first information for storage in a memory, the first information including two or more capabilities selected from a group composed of translation capabilities, processing capabilities, processing speed, and/or efficiency, of each of the hypervisor interface components; and select, based on the first information, one or more of the hypervisor interface components to handle signaling related to the platform of the hypervisor; and processing signaling related to the hypervisor as a function of the platform of the hypervisor;

wherein the hypervisor interface module is configured to handle signaling related to hypervisors having different platforms such that differences in the hypervisor platforms are transparent to, or able to be rectified without user action in/while being translated between, the hypervisors.

22. The method of claim 21 utilized to perform a management function for a virtual resource moved from one hypervisor environment to another hypervisor environment, the method further comprising:

performing a management function for a virtual resource executing within a first hypervisor environment, wherein signaling related to the management function is translated by a hypervisor interface component associated with the first hypervisor environment;

processing an indicator that the virtual resource has moved from the first hypervisor environment to a second hypervisor environment, wherein the indicator can be received in response to a query to the virtual resource, the first hypervisor of the first hypervisor environment, and/or first hypervisor of the second hypervisor environment, and wherein the query is defined by and is sent from the hypervisor interface module; and performing the management function for the virtual resource when the virtual resource is executing within the second hypervisor environment, wherein signaling related to the management function can be translated by a hypervisor interface component associated with the second hypervisor environment.

23. The method of claim 21 wherein the method performs management functions related to the operation of virtual resources at a host device that is partitioned so that incompatible hypervisors concurrently operate within the different partitions of the host device.

24. The method of claim 21 wherein the hypervisor interface module is provided as a component of a management module and is configured so that such updates can be made during run-time of the management module without terminating or pausing the operation of the management module.

25. The method of claim 21 wherein the first signal is received in response to a virtual machine reallocation instruction associated with the first device.

26. The method of claim 21 wherein the second hypervisor interface module is selected from a library of hypervisor interface components based at least in part on a user preference.

* * * * *